United States Patent [19]

Purvis

[11] Patent Number: 4,612,962

[45] Date of Patent: Sep. 23, 1986

[54] SPRING-LOADED VALVE

[75] Inventor: Michael J. Purvis, Fenton, Mo.

[73] Assignee: Control Devices, Incorporated, St. Louis, Mo.

[21] Appl. No.: 744,550

[22] Filed: Jun. 14, 1985

Related U.S. Application Data

[63] Continuation of Ser. No. 246,600, Mar. 23, 1981, abandoned.

[51] Int. Cl.4 ............................................. F16K 15/02
[52] U.S. Cl. .............................. 137/543.17; 137/537; 137/522
[58] Field of Search ................... 137/537, 543.17, 522

[56] References Cited

U.S. PATENT DOCUMENTS

| | | | |
|---|---|---|---|
| 1,938,418 | 12/1933 | Evans | 251/146 |
| 2,249,971 | 7/1941 | Mecorney | 137/543.17 |
| 2,710,023 | 6/1955 | Blackford et al. | 137/543.19 |
| 3,077,206 | 2/1963 | Graham | 137/537 |
| 3,335,750 | 8/1967 | Kepner | 137/543.17 |
| 3,702,141 | 11/1972 | Wetterhorn | 137/522 |
| 4,027,691 | 6/1977 | Roffelsen | 137/543.17 |

Primary Examiner—Alan Cohan
Assistant Examiner—John A. Rivell
Attorney, Agent, or Firm—Senniger, Powers, Leavitt and Roedel

[57] ABSTRACT

In a spring-loaded valve, a coil spring functions not only to bias a valve member toward its seat but also to retain the valve member in assembly with the valve.

8 Claims, 5 Drawing Figures

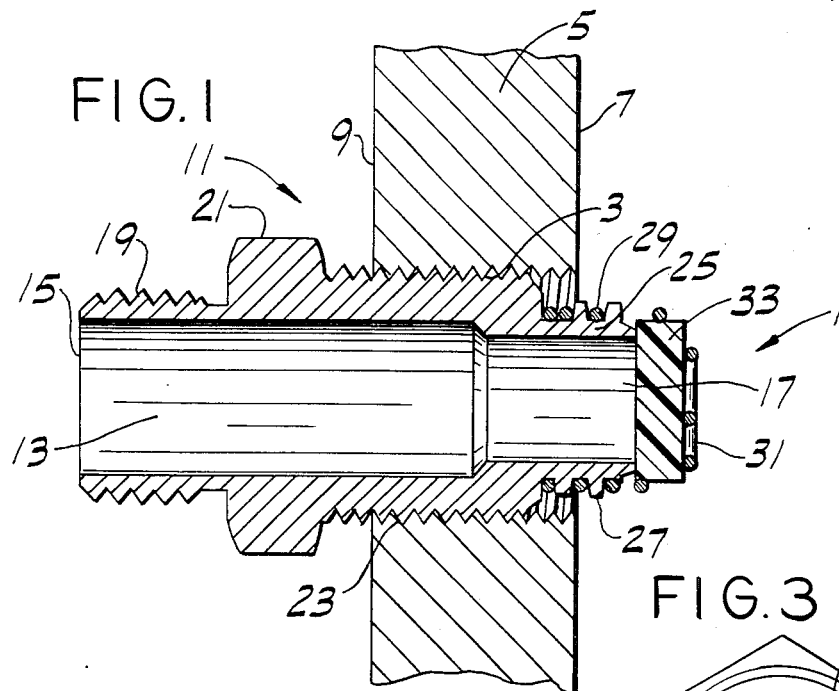
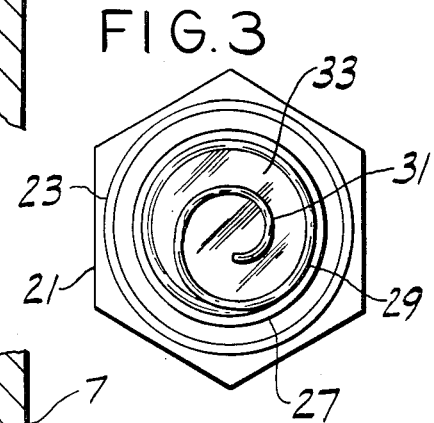
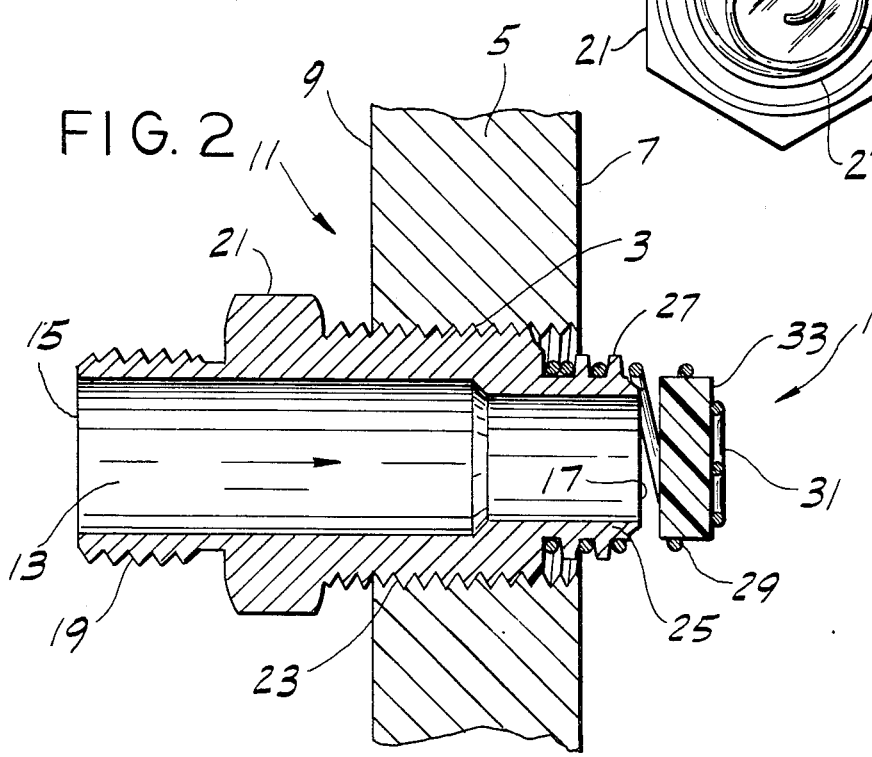

SPRING-LOADED VALVE

BACKGROUND OF THE INVENTION

This is a continuation of application Ser. No. 246,600; filed Mar. 23, 1981 now abandoned.

This invention relates to valves, and more particularly to spring-loaded air valves.

The invention is concerned, in one aspect, with a check valve which in use is connected between an air compressor and a storage tank for compressed air received from the compressor to check the return of air from the tank back to the compressor. Commonly, the outlet end of the check valve is threaded into the inlet of the tank, an air line being interconnected between the air compressor and the valve inlet. A valve of this invention is especially suited to this type of use, that is, where the outlet end of the valve is threaded into an inlet of a tank. In another aspect, the invention is concerned with a safety valve for venting air from means holding air under pressure when the pressure rises above a predetermined level.

SUMMARY OF THE INVENTION

Among the several objects of this invention may be noted the provision of an improved spring-loaded valve, e.g., a check valve or a safety valve, of simplified and economical construction; the provision of such a valve which has a minimum number of parts and which is easy to assemble; the provision of such a check valve whose valve member and its seat are readily inspected without disassembly of the valve; the provision of such a check valve in which the moving parts are mounted unenclosed at the outlet end of the valve for low cost; and the provision of such a check valve which may be installed with its unenclosed moving parts projecting into an enclosed, protected space, such as the inlet of a compressed air storage tank or the like; and the provision of such a safety valve which may be initially readily adjusted as to the opening pressure and then protected against change in adjustment.

In general, a valve of this invention comprises a valve body having a passage extending therethrough to one end of the body constituting an outlet end of the body, with a cylindric extension at said outlet end, said passage extending through said extension. The outer end of said extension constitutes a valve seat. The extension has a circumferential groove. A coil spring is secured at one end thereof constituting its inner end to said extension by engagement thereof in said circumferential groove. The spring extends endwise from said extension and has at its outer end an inwardly extending end portion. A valve member is confined within the spring between the valve seat and said inwardly extending end portion of the spring, the spring being in tension and acting via engagement of its said inwardly extending end portion with said valve member to hold the valve member in engagement with the valve seat, the valve member being movable away from the seat against the bias of the spring. The spring is of cylindrical form with its internal diameter corresponding to the diameter of said extension in said circumferential groove, the valve member being of circular outline with its external diameter such that it fits wholly within the internal diameter of the spring without any part thereof between convolutions of the spring, whereby the valve member is held confined in the spring solely by said inwardly extending end portion of the spring.

Other objects and features will be in part apparent and in part pointed out hereinafter.

BRIEF DESCRIPTION OF THE DRAWINGS

FIG. 1 is a longitudinal section of a check valve of the present invention installed in a tapped hole such as the inlet of a compressed air tank, shown with the valve closed;

FIG. 2 is a section similar to FIG. 1 showing the FIG. 1 valve open;

FIG. 3 is an end view of the outlet end of the FIG. 1 valve;

Corresponding reference characters indicate corresponding parts throughout the several views of the drawings.

DESCRIPTION OF THE PREFERRED EMBODIMENT

Figure 4:
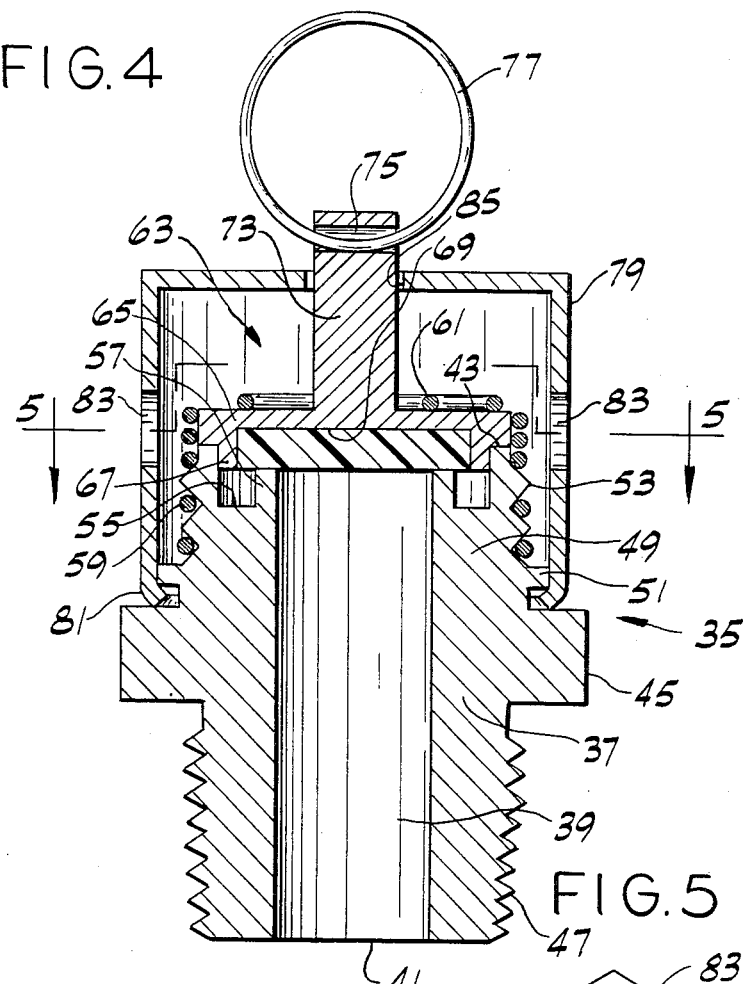
FIG. 4 is a longitudinal section of a safety valve of the present invention, showing the valve closed.

Referring first to FIGS. 1–3 of the drawings, a check valve of this invention, designated in its entirety by the numeral 1, is shown installed in a tapped hole such as the threaded inlet 3 in the wall 5 of a storage tank, such as a storage tank for compressed air supplied from an air compressor via the check valve 1. The interior surface of the storage tank wall is designated 7 and the exterior surface is designated 9.

As shown, the check valve 1 comprises an elongate valve body 11 of metal, such as brass, having an axial passage 13 extending therethrough from its inlet end 15 to its outlet end 17. The inlet end of the body has external threads 19 for connection of a line from an air compressor, for example, and has a hexagonal head 21 downstream of threads 19 which will accept a wrench. Downstream of the hexagonal head, the body has an externally-threaded cylindric portion or shank 23 for threading into inlet 3 of the storage tank. At its outlet end, downstream of threaded cylindric portion 23, the valve body has a reduced-diameter cylindric extension 25 of lesser diameter than inlet 3. The extension has a relatively coarse external screw thread 27 providing a circumferential groove.

A coil spring 29 of cylindrical form is secured to the outside of the reduced-diameter extension 25 of the valve body and extends endwise from the body (downstream therefrom) coaxial with the body. The diameter of the spring is less than that of the storage tank inlet 3 and large enough snugly to fit over extension 25 and interengage with its screw thread 27. The diameter of the spring wire forming the spring is relatively small, whereby the coils of the spring are relatively deeply engaged in the thread 27 firmly to secure the spring to the valve body. As shown in FIG. 3, the spring has an inwardly spiraling convolution 31 at its downstream end generally in a transverse plane of the spring forming a radially inwardly extending portion of the spring which partially closes its outer (downstream) end.

A valve member 33, preferably though not necessarily of a suitable plastic, such as glass-fiber-filled polytetrafluoroethylene, for example, is disposed concentrically within the spring between the end 17 of the extension 25 of the valve body, which constitutes the valve seat of the check valve, and the inwardly spiraling convolution 31 of the spring, being confined within the spring by the convolution. The valve member is shown in the drawings as a relatively thick disc, but members of other shapes may be used, for example a ball. The spring is of such length that, as assembled with the valve body with the valve member within the spring between the seat 17 and the spring end convolution 31, the spring is placed in tension by the presence of the valve member. Convolution 31 engages the outside (the downstream side) of the valve member and, as shown in FIG. 1, normally seats the valve member against the outlet end or valve seat 17 of the valve body, closing the outlet end of passage 13. As shown in FIG. 2, the valve member 33 opens against the bias of the spring when the pressure upstream of the valve member (within passge 13) exceeds the pressure downstream of the valve member by an amount which exceeds the spring tension.

As shown in the drawings, the internal diameter of the spring 29, which is cylindrical, corresponds to the diameter of the extension 25 in the groove in the extension. The valve member 33, illustrated as a disc, is of circular outline with its external diameter such that it fits wholly within the internal diameter of the spring without any part thereof between convolutions of the spring. Thus, the valve member is held confined in the spring solely by the inwardly spiraling convolution 31 at the outer end of the spring.

The check valve of this invention as described above is inexpensive and easy to assemble, having a minimum number of parts (three parts—the body, spring and valve member). Because the moving parts of the valve (spring 29 and valve member 33) are not enclosed by the valve body, they are readily inspected without disassembly of the valve. The valve is especially suited to uses in which the outlet end of the valve is threaded into an inlet in a storage tank or other enclosed space, the moving parts being protected (by being enclosed in the tank) against dirt and damage. It also appears that the valve is characterized by lower pressure losses thereacross in comparison with prior valves having a spring retainer.

Figure 5:
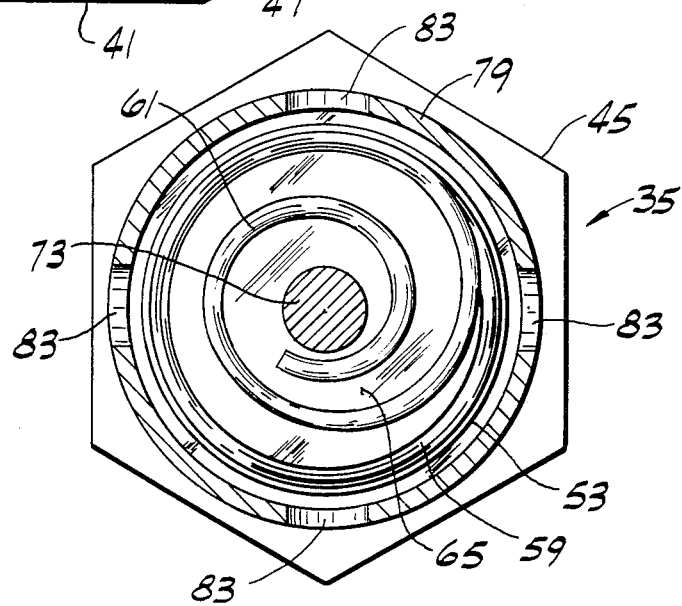
FIG. 5 is a transverse section on line 5—5 of FIG. 4.

Referring to FIGS. 4 and 5 of the drawings, a safety valve of this invention, designated in its entirety by the numeral 35, comprises an elongate tubular valve body 37 of metal, such as brass, having an axial passage 39 therethrough from its inlet end 41 to its outlet end 43. The body has a hexagonal head 45 intermediate its ends for application of a wrench to turn the valve. Upstream of the head, the body has a first externally-threaded portion or shank 47. Downstream of the head, the body has a second cylindric portion 49 having an annular external flange 51 spaced closely adjacent the head and external threads 53 downstream of the flange. At its outer end, cylindric portion 49 is formed with a circular internal recess 55 having a valve seat 57 projecting downstream within the recess. The downstream end of seat 57 is upstream of the downstream end of cylindric portion 49.

A coil spring 59 of cylindrical form is threaded on the screw thread 53 on the outside of cylindric portion 49 and extends endwise (downstream) therefrom coaxial with the body. The diameter of the spring wire forming the spring is relatively small, whereby the coils of the spring are relatively deeply engaged in the thread 53. As shown in FIG. 5, the spring has an inwardly spiraling convolution 61 forming a radially inwardly extending portion of the spring at its downstream end generally in a plane transverse of the spring, constituting means for engaging and confining a valve member, generally designated 63, within the spring.

Valve member 63 is comprised of a valve disc 65 having a central reduced-diameter cylindric portion 67 on its upstream side engageable in recess 55 on the outlet end of the valve body. Cylindric portion 67 has a central circular recess 69 in which is secured a disc-shaped resilient seal 71 (of a suitable elastomeric material) engageable with valve seat 57. The valve member has a stem 73 projecting downstream from valve disc 65 through the spring's end convolution 61. Stem 73 has a transverse hole 75 at its downstream end through which a ring pull 77 is looped.

A cover 79 is provided for the downstream end of valve 35 in the form of a cylindrical cap surrounding and spaced from cylindrical portion 49 of valve body 37, spring 59 and valve disc 65. The cover is secured at its upstream end to the valve body by crimping its rim 81 under flange 51 between the flange and hexagonal head 45. The cover has a number of fluid (air) exit openings or ports 83 (e.g., four such ports) through its side wall and has a central opening 85 in its downstream end through which stem 73 projects.

In use, the safety valve 35 is threaded into a tapped hole in communication with a pressurized space and operates to limit the pressure of fluid within the space. As shown in FIG. 4, spring 59 normally biases valve disc 65 against valve seat 57. Valve member 63 opens against the bias of spring 59 when the pressure upstream of the valve disc exceeds atmospheric pressure (the pressure downstream of the valve disc) by an amount which exceeds the spring force. Pressurized fluid then escapes past the valve disc and through ports 83. In the manufacture of the valve, the spring 59 is initially threaded on the screw thread 53, before application of the cover or cap 79, to the point where the bias of the spring on the valve member 63 corresponds to the desired blow-off pressure. The spring holds itself in its adjusted position, thereby to maintain the pre-set blow-off pressure. The cover or cap is then applied, and functions to prevent tampering with the spring. The valve may be manually opened at any time by pulling on the ring 77.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve comprising a valve body having a passage extending therethrough to one end of the body constituting an outlet end of the body, said body having a cylindric extension at said outlet end, said passage extending through said extension, the outer end of said extension constituting a valve seat, said extension having a circumferential groove, a coil spring secured at one end thereof constituting its inner end to said extension by engagement thereof in said circumferential groove, said spring extending endwise from said extension and having at its outer end an inwardly extending end portion, a valve member confined within the spring between the valve seat and said inwardly extending end portion of the spring, the spring being in tension and acting via engagement of its inwardly extending end portion with said valve member to hold the valve member in engagement with the valve seat, the valve member being movable away from the seat against the bias of the spring, the spring being of cylindrical form of generally uniform diameter except for said inwardly extending end portion with said springs internal diameter corresponding to the diameter of said extension in said circumferential groove, the valve member being of circular outline with its external diameter such that it fits wholly within the internal diameter of the spring without any part thereof between convolutions of the spring, whereby the valve member is held confined in the spring solely by said inwardly extending end portion of the spring.

2. A valve as set forth in claim 1 wherein the circumferential groove is formed by a screw thread.

3. A valve as set forth in claim 1 wherein the inwardly extending end portion of the spring comprises an inwardly spiraling convolution of the spring at the outer end of the spring.

4. A valve as set forth in claim 3 wherein the valve member is a disc, and said inwardly spiraling convolution engages the outer face of the disc.

5. A valve as set forth in claim 1 constituting a check valve for mounting in a threaded inlet of a compressed air storage tank or the like wherein the valve body has an externally threaded cylindrical shank for being threaded in the threaded inlet, said extension being a reduced-diameter cylindrical extension at one end of the shank toward the outlet end of the body for reception in the threaded inlet and projecting into the tank, said valve body further having a head at the other end of the shank for application of a wrench to thread the shank in the threaded inlet, and an externally threaded inlet portion extending from the head for connection of a line from an air compressor.

6. A valve as set forth in claim 5 wherein the circumferential groove in said extension is formed by a screw thread, and wherein the inwardly extending end portion of the spring comprises an inwardly spiraling convolution of the spring at the outer end of the spring.

7. A valve as set forth in claim 1 constituting a safety valve having a cover for the spring secured to the valve body, said cover having at least one exit opening, the valve member having a stem extending out through the end of the spring and through a hole in the cover.

8. A valve as set forth in claim 7 wherein the valve body has a head intermediate its ends for application of a wrench, a first externally screw-threaded portion upstream of the head and a second cylindric portion downstream of the head constituting said cylindric extension, the latter having an annular flange adjacent the head, the cover comprising a cap having its rim crimped between the head and the flange.

* * * * *